(12) United States Patent
Takeyama et al.

(10) Patent No.: US 8,854,727 B2
(45) Date of Patent: Oct. 7, 2014

(54) OPTICAL AMPLIFIER AND TRANSMISSION SYSTEM

(71) Applicant: Fujitsu Limited, Kawasaki (JP)

(72) Inventors: Tomoaki Takeyama, Yokohama (JP); Kosuke Komaki, Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/041,737

(22) Filed: Sep. 30, 2013

(65) Prior Publication Data

US 2014/0139906 A1    May 22, 2014

(30) Foreign Application Priority Data

Nov. 19, 2012   (JP) .................... 2012-253563

(51) Int. Cl.
*H01S 3/131*    (2006.01)

(52) U.S. Cl.
USPC ............. 359/337; 359/337.4; 359/341.41; 359/341.42

(58) Field of Classification Search
USPC .............. 359/337, 337.4, 341.41, 341.42
See application file for complete search history.

(56) References Cited

U.S. PATENT DOCUMENTS

| | | | |
|---|---|---|---|
| 6,055,092 A | 4/2000 | Sugaya | |
| 6,977,770 B2 * | 12/2005 | Komaki et al. | 359/337.11 |
| 7,929,201 B2 * | 4/2011 | Tsuzuki et al. | 359/341.41 |
| 8,670,176 B2 * | 3/2014 | Naito et al. | 359/337.4 |
| 2003/0231376 A1 | 12/2003 | Horachi | |
| 2009/0129785 A1 | 5/2009 | Murakami | |
| 2009/0257115 A1 * | 10/2009 | Komaki et al. | 359/337 |

FOREIGN PATENT DOCUMENTS

| | | |
|---|---|---|
| JP | 8-248455 | 9/1996 |
| JP | 2004-23437 | 1/2004 |
| JP | 2009-124655 | 6/2009 |

* cited by examiner

*Primary Examiner* — Mark Hellner

(74) *Attorney, Agent, or Firm* — Staas & Halsey LLP

(57) ABSTRACT

An optical amplifier includes: a first amplifier amplifying a signal light by a first excitation light; a variable optical attenuator attenuating the signal light; a second amplifier amplifying the signal light by a second excitation light; a mode selector selecting one of first and second modes; a gain controller, in first mode, controlling first and second excitation lights so that a gain of power of the signal light becomes constant; a first output controller, in second mode, controlling the first excitation light; a second output controller that, in second mode, controlling the second excitation light so that a spontaneous emission light having fixed level is outputted; and an attenuation controller controlling an attenuation of the variable optical attenuator according to an input level of the signal light in first mode, and controlling the attenuation to become a given value larger than a value of first mode in second mode.

5 Claims, 7 Drawing Sheets

OPTICAL AMPLIFIER AND TRANSMISSION SYSTEM

CROSS-REFERENCE TO RELATED APPLICATION

This application is based upon and claims the benefit of priority of the prior Japanese Patent Application No. 2012-253563 filed on Nov. 19, 2012, the entire contents of which are incorporated herein by reference.

FIELD

A certain aspect of the embodiments is related to an optical amplifier and a transmission system.

BACKGROUND

With the increase in communication demand, an optical network using a wavelength multiplexing technology (WDM: Wavelength Division Multiplexing) are widely used. The wavelength multiplexing technology is a technology which multiplexes and transmits a plurality of optical signals having different wavelengths. According to wavelength multiplexing technology, it is possible to multiplex 40 optical signals each having transmission speed of 40 (Gbps), and to transmit the multiplexed signal as a wavelength multiplexing optical signal of 1.6 (Tbps), for example.

As a transmission device using the WDM technology, an optical branch insertion device called ROADM (Reconfigurable Optical Add-Drop Multiplexer) is known. The optical branch insertion device has optical amplifiers in the input side and the output side of the wavelength multiplexing optical signal. The optical amplifier of the input side is called a pre-amplifier, and the optical amplifier of the output side is called a post-amplifier.

The optical amplifier determines a target ratio of an input level and an output level, i.e., gain, from a difference of the output level and input level of a desired light, and provide a control so that the gain becomes constant. For example, Japanese Laid-open Patent Publication No. 2004-23437 (hereinafter referred to as "Patent Document 1") discloses a technology which outputs an ASE (Amplified Spontaneous Emission) light (spontaneous emission light) from the post-amplifier of a certain node to the pre-amplifier of an adjacent node, and sets the gain of the pre-amplifier based on a level of the received ASE light.

Japanese Laid-open Patent Publication No. 8-248455 (hereinafter referred to as "Patent Document 2") discloses an optical amplifier in which optical amplification units which include an AGC (Automatic Gain Control) function are provided before and after a variable optical attenuator, respectively. Each of the optical amplification units includes a rare-earth doped fiber, an excitation light source which excites the rare-earth doped fiber, and a photodiode for monitoring a level of the light of the input side and the output side of the rare-earth doped fiber.

SUMMARY

According to an aspect of the present invention, there is provided an optical amplifier including: a first amplifier that excites an inputted signal light by a first excitation light to amplify the inputted signal light; a variable optical attenuator that attenuates the signal light outputted from the first amplifier; a second amplifier that excites the signal light outputted from the variable optical attenuator by a second excitation light to amplify the signal light; a mode selector that selects an operative state of the optical amplifier from a first mode and a second mode; a gain controller that, when the operative state is the first mode, controls the first excitation light and the second excitation light to be outputted to the first amplifier and the second amplifier, respectively so that a gain of the power of the signal light becomes constant; a first output controller that, when the operative state is the second mode, controls the first excitation light to be outputted to the first amplifier; a second output controller that, when the operative state is the second mode, controls the second excitation light to be outputted to the second amplifier so that a spontaneous emission light having a fixed level is outputted from the second amplifier to the outside of the optical amplifier; and an attenuation controller that controls an attenuation of the variable optical attenuator according to an input level of the signal light when the operative state is the first mode, and controls the attenuation so as to become a given value larger than a value in the first mode when the operative state is the second mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since the above-mentioned post-amplifier controls the gain so as to be higher than a normal gain when the ASE light is output from the above-mentioned optical amplification unit, the rare-earth doped fiber becomes an excitation state (i.e., an inverted population state) higher than a normal use state. At this time, when another signal light is inputted to the post-amplifier, optical surge having a high power occurs, so that the photodiode provided at the output side of the post-amplifier or the photodiode provided at the input side of an adjacent node may be broken down.

The above-mentioned Patent Document 1 discloses that a WDM shutter is provided at the input side of the post-amplifier in order to prevent the occurrence of the optical surge, and the WDM shutter is closed before the ASE light is output. However, there is a problem that the cost of the device increases because the WDM shutter is expensive. Moreover, since the WDM shutter is provided on an optical waveguide, there is a problem that NF (Noise Figure) is degraded (for example, 0.4 (dB)) and a transmission characteristic is deteriorated.

Figure 1:
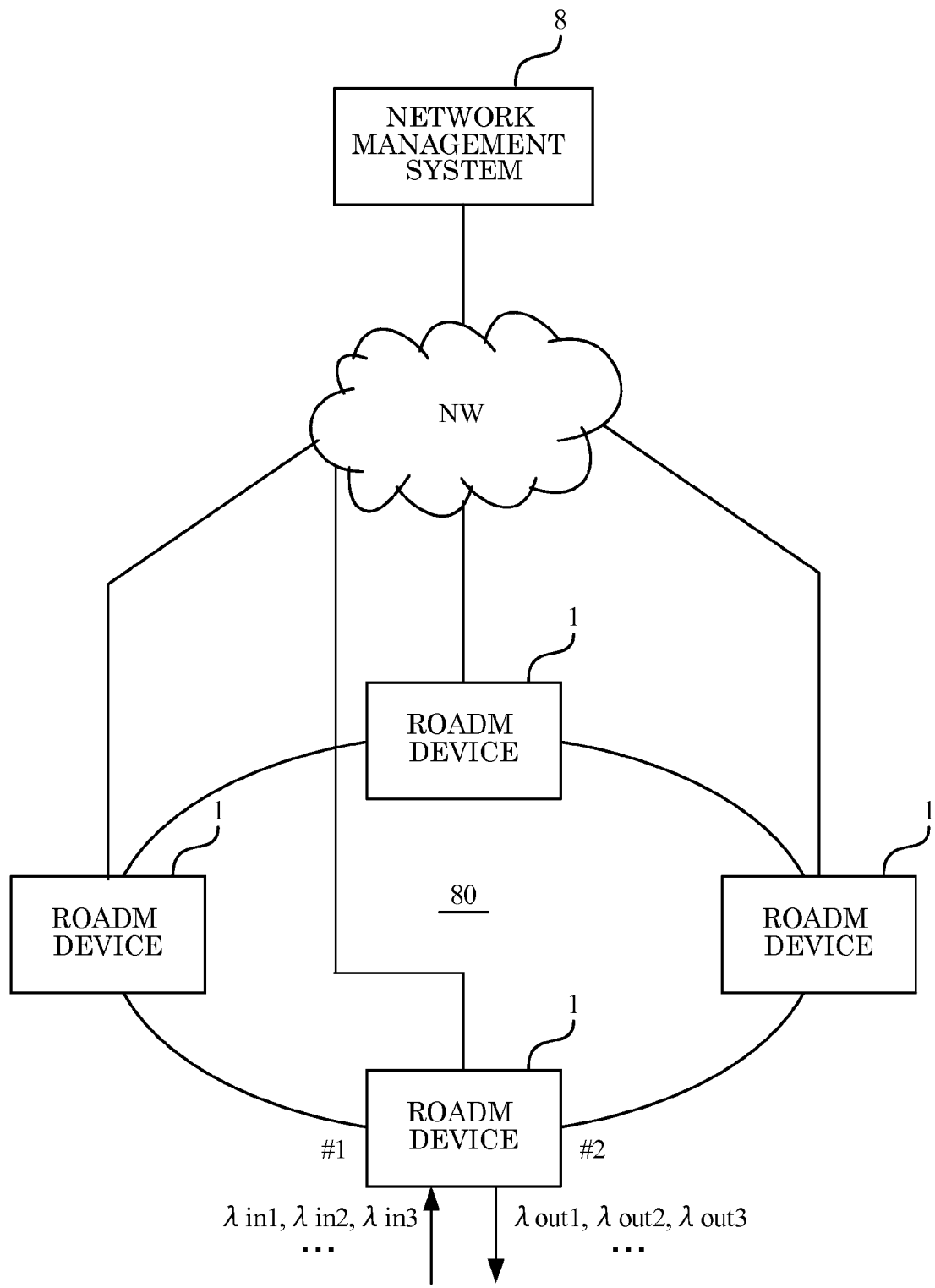
FIG. 1 is a block diagram illustrating an example of a network of ROADM (Reconfigurable Optical Add-Drop Multiplexer) devices.

FIG. 1 is a block diagram illustrating an example of a network of ROADM (Reconfigurable Optical Add-Drop Multiplexer) devices. The respective ROADM devices 1 are connected to each other via optical fibers, and constitute a ring network 80, for example. Each ROADM device 1 has two routes #1 and #2 which connect the ROADM devices 1 of adjacent nodes thereto.

A network management system (NMS) 8 manages each ROADM device 1 in the network 80. The network management system 8 is connected to each ROADM device 1 via a supervisory control network NW, such as LAN (Local Area Network).

Optical signals having wavelengths λin1, λin2, λin3 and so on are inputted to each ROADM device 1, and each ROADM device 1 performs wavelength multiplexing of the optical signals and transmits the wavelength-multiplexed signal to another ROADM device 1. In addition, each ROADM device 1 separates the optical signals having wavelengths λin1, λin2, λin3 and so on from the wavelength-multiplexed signal (i.e., multiplexed optical signal), and outputs the separated optical signals to the outside of each ROADM device 1. Therefore, the network management system 8 assigns a channel to the optical signal having each wavelength inputted to and outputted from each ROADM device 1, so that the optical signal having any wavelength is transmitted between any ROADM devices 1.

Here, in the following description, inputting the optical signals having wavelengths λin1, λin2, λin3 and so on from the outside of the ROADM device 1 to the ROADM device 1 is referred to as "insertion", and outputting the optical signals having wavelengths λin1, λin2, λin3 and so on from the ROADM device 1 to the outside thereof is referred to as "branch".

Figure 2:
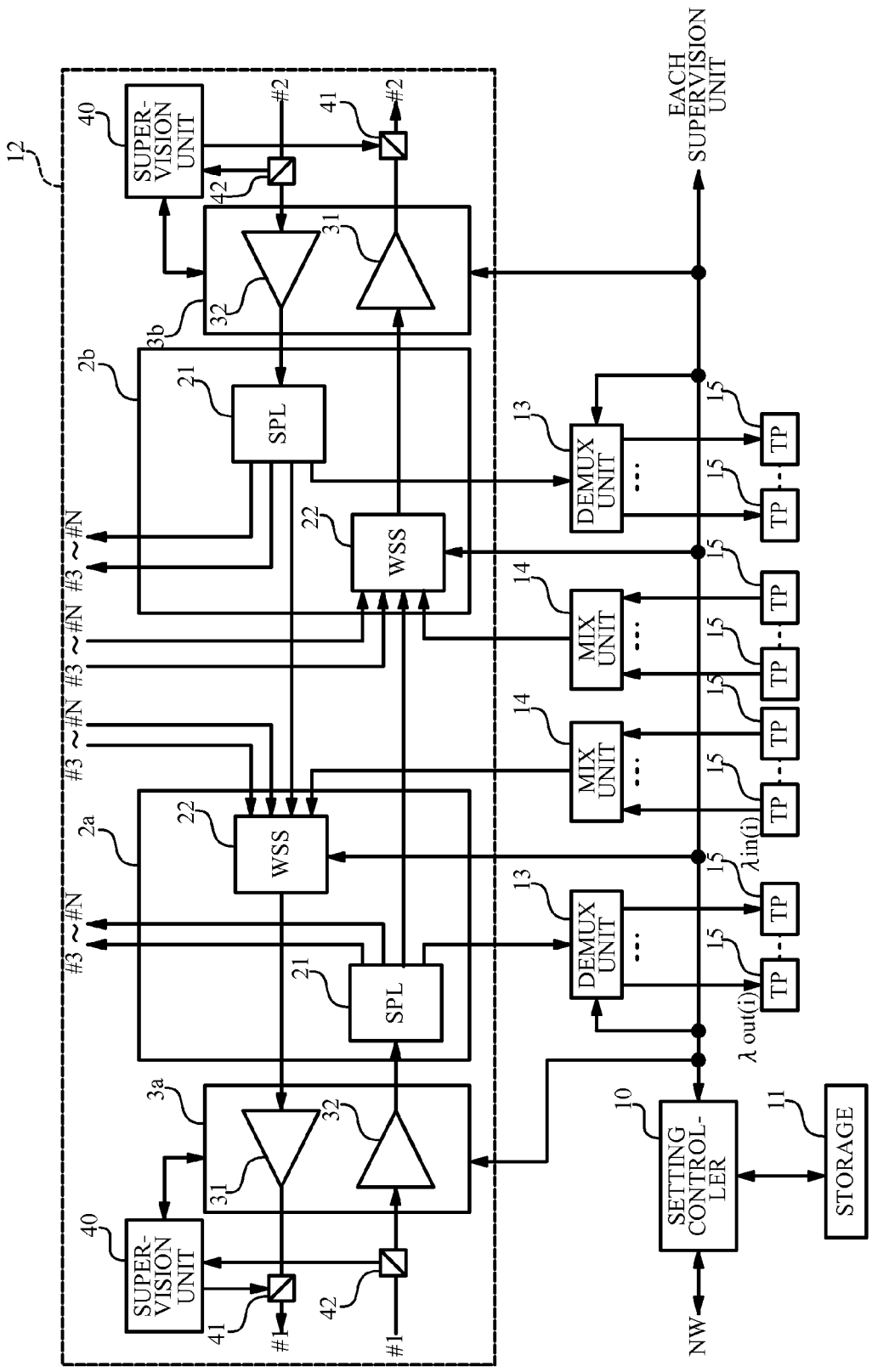
FIG. 2 is a block diagram illustrating an example of the functional configuration of the ROADM (Reconfigurable Optical Add-Drop Multiplexer) device.

FIG. 2 is a block diagram illustrating an example of the functional configuration of the ROADM device 1. The ROADM device 1 includes a setting controller 10, a storage 11, an optical cross-connection unit 12, a plurality of DEMUX (Demultiplex) units 13, a plurality of MUX (Multiplex) units 14, and a plurality of transceivers (TP) 15. The optical cross-connection unit 12 includes a plurality of amplifier units 3a and 3b provided for each of routes #1 to #N, a plurality of switching units 2a and 2b, a plurality of supervision units 40, a plurality of multiplexers 41, a plurality of splitters 42. Here, FIG. 2 indicates only the functional configuration corresponding to the respective routes #1 and #2, but the functional configuration corresponding to other routes #3 to #N is the same as the above-mentioned functional configuration.

The amplifier unit 3a includes an input-side optical amplifier 32 (pre-amplifier) that amplifies the multiplexed optical signal inputted from the route #1, and an output-side optical amplifier 31 (post-amplifier) that amplifies the multiplexed optical signal to be outputted to the route #1. The amplifier unit 3b includes an input-side optical amplifier 32 (pre-amplifier) that amplifies the multiplexed optical signal inputted from the route #2, and an output-side optical amplifier 31 (post-amplifier) that amplifies the multiplexed optical signal to be outputted to the route #2. Each of the switching units 2a and 2b includes an optical splitter (SPL) 21 and a wavelength selection switch (WSS) 22.

The optical splitter 21 is a device which splits the light inputted to an input port and outputs the split lights from a plurality of output ports. The input port of the optical splitter 21 is connected to an output port of the input-side optical amplifier 32. On the other hand, the output ports are connected to an input port of the DEMUX unit 13 and input ports of the wavelength selection switches 22 of other routs #1 to #N. Thereby, the optical splitter 21 outputs the multiplexed optical signal inputted from the input-side optical amplifier 32, to the DEMUX unit 13 and the wavelength selection switches 22 of the other routs #1 to #N.

The wavelength selection switch 22 is a device which selects the wavelengths of the lights inputted from respective input ports, multiplexes the lights having the selected wavelengths, and outputs the multiplexed signal from an output port of the wavelength selection switch 22. The input ports of the wavelength selection switch 22 are connected to an output port of the MUX unit 14 and output ports of the optical splitters 21 of the other routs #1 to #N. On the other hand, the output port of the wavelength selection switch 22 is connected to an input port of the output-side optical amplifier 31.

Thereby, the wavelength selection switch 22 multiplexes the multiplexed optical signal inputted from the MUX unit 14 to the multiplexed optical signal inputted from the optical splitters 21 of the other routs #1 to #N, and outputs the resultant multiplexed optical signal. The multiplexed optical signal outputted from the wavelength selection switch 22 is outputted to a corresponding one of the routes #1 to #N via the output-side optical amplifier 31. Here, the selection of the wavelength in the wavelength selection switch 22 is performed according to the setting from the setting controller 10.

In order for the branch of the optical signal, the DEMUX unit 13 separates the optical signal having each wavelength λin(i) from the multiplexed optical signal inputted from a predetermined one of the routes #1 to #N. The DEMUX unit 13 includes an array waveguide grating (AWG).

The array waveguide grating separates the optical signal having a predetermined wavelength for each output port of the DEMUX unit 13, from the multiplexed optical signal inputted from the output port of the optical splitter 21, and outputs the separated optical signal to the transceiver 15. The optical signal outputted to the transceiver 15 is outputted to an external device.

On the contrary, in order for the insertion of the optical signal, the MUX unit 14 outputs the optical signal inputted from the external device via the transceiver 15 to the input port of the wavelength selection switch 22. The MUX unit 14 includes an array waveguide grating. The array waveguide grating multiplexes optical signals inputted from the transceivers 15, and outputs the multiplexed optical signal to the input port of the wavelength selection switch 22.

The setting controller 10 is an arithmetic processing circuit, such as a CPU (Central Processing Unit), and controls the ROADM device 1 based on a given program. The setting controller 10 communicates with the network management system 8 via the supervisory control network NW. Here, the setting controller 10 is not limited to a component which functions by software, but may be a component which functions by hardware, such as an application specific integrated circuit.

The storage 11 is a memory, for example, and stores a setting table in which the assignment setting of the channel with respect to the wavelength of the optical signal is registered. The setting controller 10 performs a setting process to the wavelength selection switch 22 with reference to the setting table.

The supervision unit 40 processes a supervisory signal of OSC (Optical Supervisory Channel) included in the multiplexed optical signal. The supervision unit 40 generates the supervisory signal, and outputs the supervisory signal to the multiplexer 41. The multiplexer 41 is an optical coupler, for example. The multiplexer 41 multiplexes the supervisory signal to the multiplexed optical signal outputted from the output-side optical amplifier 31, and outputs the resultant multiplexed optical signal to the corresponding route #1 or #2.

The supervision unit 40 receives the multiplexed optical signal inputted from the corresponding route #1 or #2 via the splitter 42, and extracts the supervisory signal from the multiplexed optical signal. The splitter 42 is an optical splitter, for example. The splitter 42 splits the multiplexed optical signal, and outputs the split signals to the supervision unit 40 and the input-side optical amplifier 32, respectively.

The supervision unit 40 is connected to the setting controller 10 and the amplifier unit 3a or 3b. The supervision unit 40 acquires various supervisory control information from the setting controller 10 and the amplifier unit 3a or 3b, and generates the supervisory signal including the supervisory control information. In addition, the supervision unit 40 acquires various supervisory control information from the supervisory signal extracted from the multiplexed optical signal, and outputs the supervisory control information to the setting controller 10 and the amplifier unit 3a or 3b. Thus, the supervisory signal is used for supervisory control between the ROADM devices 1 provided on the respective nodes.

As the supervisory control information inputted to and outputted from the setting controller 10, failure information or the like is implemented, for example. As the supervisory control information inputted to and outputted from the amplifier unit 3a or 3b, level information concerning the light outputted from the output-side optical amplifier 31 is implemented, for example. The level information is used for measurement of the transmission loss of a transmission channel to the adjacent node, as described later.

Figure 3:
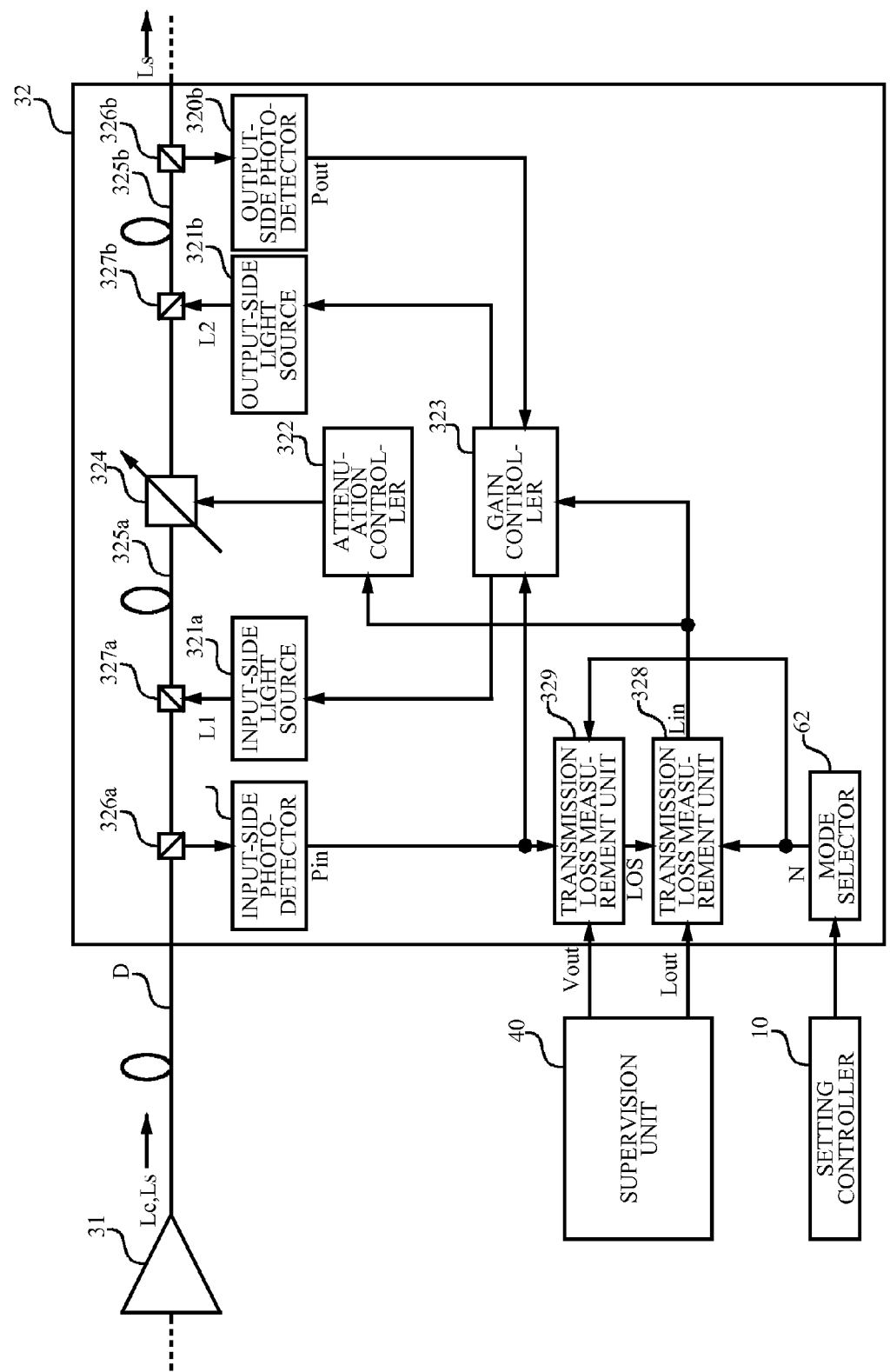
FIG. 3 is a block diagram illustrating an example of the functional configuration of an input-side optical amplifier.

FIG. 3 is a block diagram illustrating an example of the functional configuration of the input-side optical amplifier 32. The input-side optical amplifier 32 is connected to the output-side optical amplifier 31 in the ROADM device 1 of the adjacent node via a transmission channel D. Thus, the input-side optical amplifier 32 and the output-side optical amplifier 31 constitute a transmission system that transmits and receives the optical signal via the transmission channel D. The input-side optical amplifier 32 inputs the light outputted from the output-side optical amplifier 31 via the transmission channel D.

The input-side optical amplifier 32 includes an input-side photodetector 320a, an output-side photodetector 320b, an input-side light source 321a, an output-side light source 321b, splitters 326a and 326b, multiplexers 327a and 327b, an input level calculation unit 328, and a transmission loss measurement unit 329. The input-side optical amplifier 32 further includes a variable optical attenuator 324, an attenuation controller 322, a gain controller 323, an input-side EDF (Erbium Doped Fiber) 325a, an output-side EDF 325b, and a mode selector 62.

The mode selector 62 selects an operative state of the input-side optical amplifier 32 from an operational mode and a setting mode according to an instruction from the setting controller 10. The setting mode is an operative state in which the input-side optical amplifier 32 is adjusted before the ROADM device 1 begins the transmission of a signal light Ls (i.e., the above-mentioned multiplexed optical signal). In the setting mode, the input-side optical amplifier 32 inputs an ASE (Amplified Spontaneous Emission) light Le from the output-side optical amplifier 31, and measures a transmission loss LOS of the transmission channel D based on a detection result of an input level Pin of the ASE light Le. The transmission loss LOS is used for the calculation of an input level Lin of the signal light Ls.

On the other hand, the operational mode is an operative state in which the ROADM device 1 transmits the signal light Ls. The input-side optical amplifier 32 inputs the signal light Ls from the output-side optical amplifier 31, flattens the wavelength characteristic of the signal light Ls, controls the signal light Ls in a constant level, and outputs the signal light Ls to the subsequent switching units 2a or 2b. In the control of the signal light Ls, the output-side optical amplifier 31 uses the input level Lin of the signal light Ls calculated from the transmission loss LOS. With respect to the signal light Ls, a band is C band (1530 to 1570 nm), a wavelength interval is 100 GHz, and a maximum number of wavelengths is 40, for example.

In the operational mode, the signal light Ls inputted from the transmission channel D is inputted to the input-side EDF 325a via the splitters 326a and the multiplexer 327a. The input-side EDF 325a excites the inputted signal light Ls by a first excitation light L1 inputted from the input-side light source 321a to amplify the signal light Ls. The variable optical attenuator 324 attenuates the signal light Ls outputted from the input-side EDF 325a. The output-side EDF 325b excites the signal light Ls outputted from the variable optical attenuator 324 via the multiplexer 327b by a second excitation light L2 inputted from the output-side light source 321b to amplify the signal light Ls. The signal light Ls outputted from the output-side EDF 325b is inputted to the subsequent switching units 2a or 2b via the splitter 326b. Instead of the input-side EDF 325a and the output-side EDF 325b, another rare-earth doped optical fiber may be used as an amplification means of the signal light Ls.

The input-side light source 321a and the output-side light source 321b output the first excitation light L1 and the second excitation light L2 to the input-side EDF 325a and the output-side EDF 325b via the multiplexer 327a and the multiplexer 327b, respectively. Here, the multiplexer 327a and the multiplexer 327b are optical couplers, for example.

The splitter 326a splits the ASE light Le or the signal light Ls inputted from the transmission channel D, and outputs the split signals to the multiplexer 327a and the input-side photodetector 320a. The input-side photodetector 320a detects input powers Pin of the ASE light Le and the signal light Ls inputted to the input-side optical amplifier 32, and notifies the transmission loss measurement unit 329 and the gain controller 323 of the detected input powers Pin.

On the other hand, the splitter 326b splits the signal light Ls inputted from the output-side EDF 325b, and outputs the split signals to the output-side photodetector 320b and the outside of the input-side optical amplifier 32. The output-side photodetector 320b detects an output power Pout of the signal light Ls to be outputted from the input-side optical amplifier 32, and notifies the gain controller 323 of the detected output power Pout. Here, the input-side photodetector 320a and the output-side photodetector 320b are photodiodes, for example. The splitters 326a and 326b are optical splitters, for example.

The gain controller 323 controls the first excitation light L1 of the input-side light source 321a and the second excitation light L2 of the output-side light source 321b based on the input power Pin and the output power Pout of the signal light Ls. The gain controller 323 controls the output of the input-side light source 321a and the output-side light source 321b so that the ratio of the input power Pin and the output power Pout, i.e., the gain becomes constant. The gain controller 323 determines a target value of the gain depending on a difference between a desired output level of the signal light Ls and the input level Lin of the signal light Ls acquired from the input level calculation unit 328.

The attenuation controller 322 outputs a control signal (i.e., a voltage level) to the variable optical attenuator 324 to control the attenuation. The attenuation controller 322 controls the attenuation of the variable optical attenuator 324 based on the input level Lin of the signal light Ls acquired from the input level calculation unit 328 so as to flatten the wavelength characteristic. When the input level Lin is larger than a reference value, the attenuation controller 322 increases the attenuation depending on a difference between the input level Lin and the reference value, and reduces the fluctuation of the gain (i.e., gain deviation) for each wavelength which arises according to the arrangement of the wavelength of the signal light Ls. Thereby, the input-side optical amplifier 32 flattens the wavelength characteristic of the inputted signal light Ls, and outputs the signal light Ls at a constant output level. Here, information on the arrangement of the wavelength may be included in the supervisory signal of the OSC (Optical Supervisory Channel), for example, and may be acquired from the supervision unit 40.

The mode selector 62 outputs a mode notification signal N notifying a selected mode to the transmission loss measurement unit 329 and the input level calculation unit 328. In the setting mode, the transmission loss measurement unit 329 measures the transmission loss LOS of the transmission channel D based on an output level Vout and the input level Pin of the ASE light Le inputted from the output-side optical amplifier 31. The transmission loss LOS is acquired as a difference between the output level Vout and the input level Pin of the ASE light Le. The input level Pin is detected by the input-side photodetector 320a, and is notified to the transmission loss measurement unit 329. The output level Vout is acquired from the supervisory signal of the OSC by the supervision unit 40, and is notified to the transmission loss measurement unit 329.

In the operational mode, the input level calculation unit 328 calculates the input level Lin of the signal light Ls inputted to the input-side optical amplifier 32 based on a design value Lout of the output level of the signal light Ls of the output-side optical amplifier 31, and the transmission loss LOS of the transmission channel D. The input level Lin of the signal light Ls is calculated as a difference between the design value Lout of the output level and the transmission loss LOS of the transmission channel D. Here, information indicating the design value Lout of the output level of the signal light Ls is included in the supervisory signal of the OSC, and is acquired from the supervision unit 40. The calculated input level Lin is notified to the attenuation controller 322 and the gain controller 323.

Thus, since the transmission system including the input-side optical amplifier 32 and the output-side optical amplifier 31 measures the transmission loss LOS by using the ASE light Le, measurement time can be shortened and the operative state can be immediately shifted from the setting mode to the operational mode. If the measurement is performed by using the signal light Ls, it takes much time to acquire information on the number of wavelengths from the supervision unit 40, and convert the input level of the signal light Ls into an input level per one wave by using the number of wavelengths.

Since the ASE light Le has the same wavelength band as the signal light Ls, the transmission loss can be measured with high precision, compared with the supervisory signal of the OSC which differs from the ASE light Le in a wavelength band.

Figure 4:
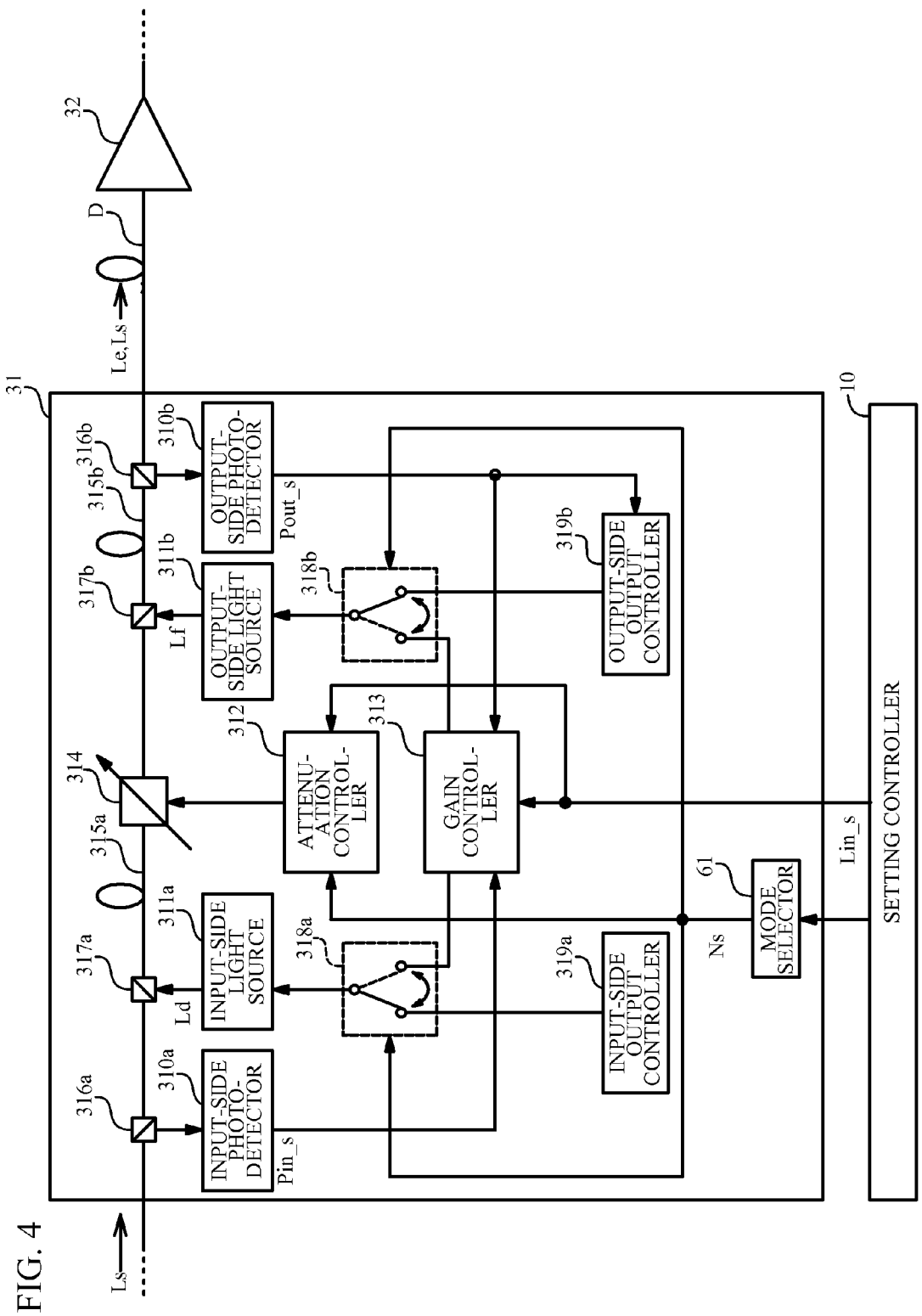
FIG. 4 is a block diagram illustrating the functional configuration of an optical amplifier (i.e., an output-side optical amplifier) according to an embodiment.

A description will be given of the configuration of the output-side optical amplifier 31 which outputs the ASE light Le. FIG. 4 is a block diagram illustrating the functional configuration of an optical amplifier 31 according to an embodiment. The output-side optical amplifier 31 outputs the light to the input-side optical amplifier 32 via the transmission channel D.

The output-side optical amplifier 31 includes an input-side photodetector 310a, an output-side photodetector 310b, an input-side light source 311a, an output-side light source 311b, splitters 316a and 316b, multiplexers 317a and 317b, an input-side EDF 315a (a first amplification unit), and an output-side EDF 315b (a second amplification unit). The output-side optical amplifier 31 further includes a variable optical attenuator 314, an attenuation controller 312, a gain controller 313, an input-side switching unit 318a, an output-side switching unit 318b, an input-side output controller 319a (a first output controller), an output-side output controller 319b (a second output controller), and a mode selector 61.

The mode selector 61 selects the operative state of the output-side optical amplifier 31 from the operational mode (a first mode) and the setting mode (a second mode) according to an instruction from the setting controller 10. The operational mode and the setting mode are as mentioned above. In the setting mode, the output-side optical amplifier 31 outputs the ASE light Le to the input-side optical amplifier 32. On the other hand, in the operational mode, the output-side optical amplifier 31 flattens the wavelength characteristic of the signal light Ls inputted from the preceding switching unit 2a or 2b, controls the signal light Ls in a constant output level, and outputs the signal light Ls to the input-side optical amplifier 32. In order to switch the operative state, the mode selector 61 outputs a mode notification signal Ns notifying a selected mode to the attenuation controller 312, the input-side switching unit 318a, and the output-side switching unit 318b.

In the operational mode, the output-side optical amplifier 31 controls the output level of the signal light Ls, as with the input-side optical amplifier 32. The input-side photodetector 310a, the output-side photodetector 310b, the input-side light source 311a, and the output-side light source 311b correspond to the above-mentioned input-side photodetector 320a, the above-mentioned output-side photodetector 320b, the above-mentioned input-side light source 321a, and the above-mentioned output-side light source 321b, respectively. The splitters 316a and 316b, the multiplexers 317a and 317b, the input-side EDF 315a, and the output-side EDF 315b correspond to the above-mentioned splitters 326a and 326b, the above-mentioned multiplexers 327a and 327b, the above-mentioned input-side EDF 325a, and the above-mentioned output-side EDF 325b, respectively. The variable optical attenuator 314, the attenuation controller 312, and the gain controller 313 correspond to the above-mentioned variable optical attenuator 324, the above-mentioned attenuation controller 322, and the above-mentioned gain controller 323, respectively.

In the operational mode, the signal light Ls outputted from the preceding switching unit 2a or 2b is outputted to the input-side EDF 315a via the splitter 316a and the multiplexer 317a. The input-side EDF 315a excites the signal light Ls by a first excitation light Ld inputted from the input-side light source 311a to amplify the signal light Ls. The variable optical attenuator 314 attenuates the signal light Ls outputted from the input-side EDF 315a. The output-side EDF 315b excites the signal light Ls outputted from the variable optical attenuator 314 via the multiplexer 317b by a second excitation light Lf inputted from the output-side light source 311b to amplify the signal light Ls. The signal light Ls outputted from the output-side EDF 315b is outputted to the transmission channel D via the splitter 316b. Instead of the input-side EDF 315a and the output-side EDF 315b, another rare-earth doped optical fiber may be used as an amplification means of the signal light Ls.

When the gain of an average of the wavelength is set to 22.5 (dB), the total of the lengths of the input-side EDF 315a and the output-side EDF 315b is set to 25 (m) so that the wavelength characteristic may become the flattest. It is desirable that each of the lengths of the input-side EDF 315a and the output-side EDF 315b is long from a viewpoint of the absorption efficiency of the excitation lights Ld and Lf. However, since the total of the lengths is determined as mentioned above, each of the lengths of the input-side EDF 315a and the output-side EDF 315b is set to 11 (m) and 14 (m), for example.

The attenuation controller 312 and the gain controller 313 acquire an input level Lin_s of the signal light Ls to be inputted from the preceding switching unit 2a or 2b, from the setting controller 10. When the operative state is the operational mode, the attenuation controller 312 controls the attenuation of the variable optical attenuator 314 according to the input level Lin_s of the signal light Ls.

The minimum of the input level Lin_s is −20 (dBm/ch), for example, and the output level is 2.5 (dBm/ch) when the gain is set to 22.5 (dB). When the output-side optical amplifier 31 is not the ROADM device, i.e., the output-side optical amplifier 31 and the input-side optical amplifier 32 are directly connected to each other and the switching units 2a and 2b do not exist, the setting controller 10 notifies the attenuation controller 312 and the gain controller 313 of the input level Lin_s having a different value.

The input-side switching unit 318a selects one of the gain controller 313 and the input-side output controller 319a, and switches a connection destination to the selected destination. The connection destination is selected based on the mode notification signal Ns. Thereby, in the operational mode, the input-side light source 311a is connected to the gain controller 313. In the setting mode, the input-side light source 311a is connected to the input-side output controller 319a.

On the other hand, the output-side switching unit 318b selects one of the gain controller 313 and the output-side output controller 319b, and switches a connection destination to the selected destination. The connection destination is selected based on the mode notification signal Ns. Thereby, in the operational mode, the output-side light source 311b is connected to the gain controller 313. In the setting mode, the output-side light source 311b is connected to the output-side output controller 319b. Thus, the output-side optical amplifier 31 can control the first excitation light Ld and the second excitation light Lf according to the operative state, by the mode notification signal Ns.

In the operational mode, the gain controller 313 controls the output of the first excitation light Ld and the second excitation light Lf to be outputted from the input-side light source 311a and the output-side light source 311b, respectively so that the ratio of the input power Pin_s and the output power Pout_s detected by the input-side photodetector 310a and the output-side photodetector 310b, respectively, i.e., the gain becomes constant. On the other hand, in the setting mode, the input-side output controller 319a controls the first excitation light Ld to be outputted from the input-side light source 311a to the input-side EDF 315a, and the output-side output controller 319b controls the second excitation light Lf to be outputted from the output-side light source 311b to the output-side EDF 315b.

When the operative state is the setting mode, the output-side output controller 319b controls the second excitation light Lf to be outputted to the output-side EDF 315b so that the ASE light Le (spontaneous emission light) having a fixed level is outputted from the output-side EDF 315b to the outside of the output-side optical amplifier 31. The output-side output controller 319b controls the output of the output-side light source 311b to output the ASE light Le from the output-side EDF 315b to the transmission channel D. At this time, the output-side photodetector 310b detects a level Pout_s of the outputted ASE light Le, and notifies the output-side output controller 319b of the detected level Pout_s.

The output-side output controller 319b controls the second excitation light Lf to be outputted to the output-side EDF 315b based on the detection result of the level Pout_s of the ASE light Le outputted from the output-side EDF 315b. Therefore, the output-side output controller 319b can perform feedback control so that the output level of the ASE light Le becomes a desired value.

The output-side output controller 319b controls the output level of the ASE light Le so that an energy of the excitation state of the output-side EDF 315b becomes higher than an energy of the operational mode. It is desirable that the output level of the ASE light Le is set as a high value so that the input-side photodetector 320a provided in the input-side optical amplifier 32 of the adjacent node does not receive the influence of a dark current. However, when the energy of the excitation state of the output-side EDF 315b becomes high too much, the output-side EDF 315b oscillates. Therefore, the output level of the ASE light Le is set to 2.5 (dBm), for example. At this time, the output power of the second excitation light Lf is 33 (mW).

At the time of the output of the ASE light Le, the gain of the output-side EDF 315b is 30.3 (dB), for example. Here, the return loss of the optical parts in the both ends of the output-side EDF 315b is 50 (dB), for example. Therefore, when the gain of the output-side EDF 315b is 30.3 (dB), a possibility that the oscillation occurs in the output-side EDF 315b is very small.

At the time of the output of the ASE light Le, the energy of the excitation state in the output side EDF 315b becomes higher than the energy of the operational mode. Therefore, when the signal light Ls is inputted to the output-side optical amplifier 31, the optical surge with a high power may occur. In the setting mode, a case where the transceiver 15 is added to the ROADM device 1 and a case where the ROADM device 1 of another node outputs the signal light Ls are mentioned as a case where the signal light Ls is inputted, for example.

When the optical surge occurs, the output-side photodetector 310b, or the input-side photodetector 320a provided in the input-side optical amplifier 32 of the adjacent node may be broken down for a power exceeding a rated value. Even if the optical surge is not a sufficient level for destruction, in the input-side optical amplifier 32, the input level Pin is momentarily changed, and hence an error may occur in the transmission loss LOS of the transmission channel D to be measured.

When the operative state is the setting mode, the attenuation controller 312 controls the attenuation of the variable optical attenuator 314 so as to become a given value of the attenuation larger than a value in the operational mode, and hence reduce the level of the signal light Ls to be inputted to the extent that the optical surge does not occur. Since it is desirable that the attenuation of the variable optical attenuator 314 is larger in order to reduce the level of the signal light Ls, the attenuation controller 312 may set the attenuation to a maximum value (e.g. 20 (dB)) in the setting mode.

When the operative state is the setting mode, the input-side output controller 319a stops outputting the first excitation light Ld to the input-side EDF 315a.

That is, the input-side output controller 319a stops (shuts down) the output of the input-side light source 311a. Therefore, in the setting mode, the first excitation light Ld is not inputted to the input-side EDF 315a, and hence the input-side EDF 315a becomes an unexcited state, and functions as a loss medium which reduce the level of the signal light Ls.

For example, when the length of the input-side EDF 315a is set to 11 (m), it is possible to generate the loss of 22.7 (dB) as an average value of each wavelength. Therefore, when the attenuation of the variable optical attenuator 314 is set to 20 (dB), the loss of a total of 42.7 (dB) can be generated.

Figure 5:
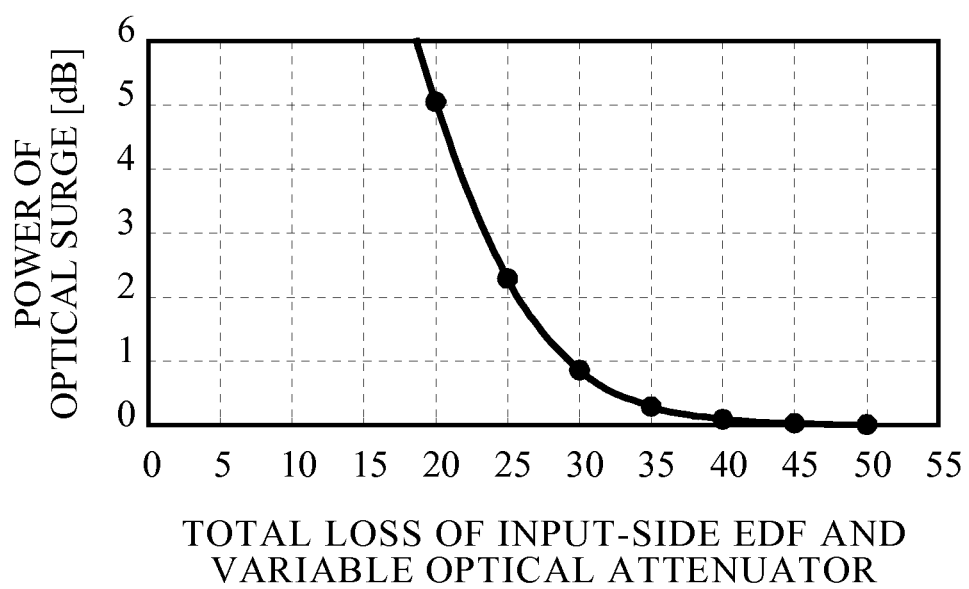
FIG. 5 is a graph illustrating the variation of the power of optical surge with respect to the total loss of an input-side EDF (Erbium Doped Fiber) and a variable optical attenuator.

FIG. 5 is a graph illustrating the variation of the power of the optical surge with respect to the total loss of the input-side EDF 315a and the variable optical attenuator 314. This graph indicates a result of simulation performed by assuming that the signal light Ls to be inputted is changed from the state of zero wave to the state of 80 waves. Here, it is assumed that the output-side EDF315b is excited so that the gain becomes 30.3 (dB).

When the attenuation of the variable optical attenuator 314 is about 20 (dB), the power of the optical surge when only the loss by the variable optical attenuator 314 is used is 5 (dB), as is clear from FIG. 5. On the other hand, when the total loss of the input-side EDF 315a and the variable optical attenuator 314 is 42.7 (dB) as described above, the power of the optical surge when the loss of both of the input-side EDF 315a and the variable optical attenuator 314 is used is 0.1 (dB). In advance of the output of the ASE light Le, the optical surge is more effectively restrained by stopping the output of the first excitation light Ld of the input-side light source 311a in addition to the control of the attenuation of the variable optical attenuator 314.

In the present embodiment, the attenuation of the variable optical attenuator 314 is controlled based on a voltage level of the control signal inputted from the attenuation controller 312. The variation characteristic of the attenuation with respect to this voltage level is varied by secular variation, and environmental variation such as temperature variation. Therefore, it is desirable that the attenuation controller 312 controls the attenuation based on the detection result of the level of the light inputted to the variable optical attenuator 314 and the level of the light outputted from the variable optical attenuator 314.

Figure 6:
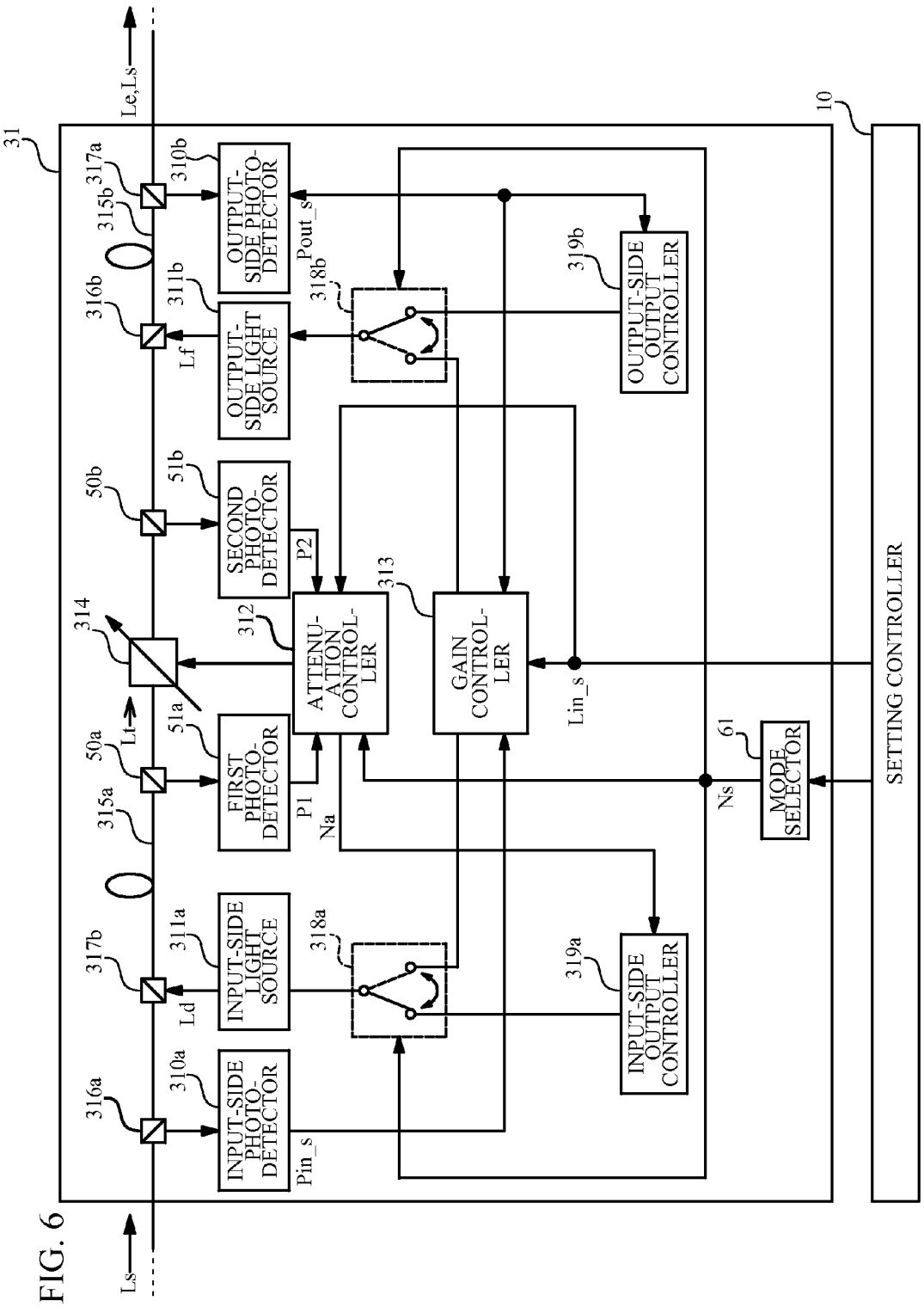
FIG. 6 is a block diagram illustrating the functional configuration of the optical amplifier (i.e., the output-side optical amplifier) according to another embodiment.

FIG. 6 is a block diagram illustrating the functional configuration of the output-side optical amplifier 31 according to another embodiment. In FIG. 6, components identical or similar to those of FIG. 4 are designated by identical reference numerals, and detailed description thereof is omitted.

Before the input-side output controller 319a stops outputting the first excitation light Ld to the input-side EDF 315a, the input-side output controller 319a controls the first excitation light Ld to be outputted to the input-side EDF 315a so that the ASE light Lt (spontaneous emission light) having a fixed level is outputted from the input-side EDF 315a. Then, the attenuation controller 312 adjusts the attenuation of the variable optical attenuator 314 to a given value, based on a level P1 of the ASE light Lt, which is outputted from the input-side EDF315a, in the input side of the variable optical attenuator 314, and a level P2 of the ASE light Lt in the output side of the variable optical attenuator 314. At this time, before the ASE light Lt is outputted, the output-side output controller 319b stops the output of the second excitation light Lf of the output-side light source 311b so that the surge does not occur by the ASE light Lt outputted from the input-side EDF315a.

The input-side optical amplifier 32 further includes splitters 50a and 50b, a first photodetector 51a, and a second photodetector 51b in addition to the components illustrated in FIG. 4. The splitter 50a splits the ASE light Lt outputted from the input-side EDF315a, and outputs the split ASE light Lt to the variable optical attenuator 314 and the first photodetector 51a. The first photodetector 51a detects the level P1 of the ASE light inputted to the variable optical attenuator 314.

On the other hand, the splitter 50b splits the ASE light Lt outputted from the variable optical attenuator 314, and outputs the split ASE light Lt to the second photodetector 51b. The second photodetector 51b detects the level P2 of the ASE light Lt outputted from the variable optical attenuator 314.

When the operative state is the setting mode, the attenuation controller 312 controls the attenuation so as to become the given value as mentioned above, based on the detection result of the levels P1 and P2 of the ASE light Lt acquired from the first photodetector 51a and the second photodetector 51b. At this time, the attenuation is acquired as a difference between the levels P1 and P2 detected by the first photodetector 51a and the second photodetector 51b. The attenuation controller 312 can control the attenuation of the variable optical attenuator 314 while supervising the attenuation of the variable optical attenuator 314. Therefore, the attenuation controller 312 can control the attenuation with high accuracy regardless of the variation of characteristic of the attenuation with respect to the above-mentioned voltage.

After the attenuation reaches the given value, the input-side output controller 319a stops the output of the first excitation light Ld of the input-side light source 311a. At this time, the attenuation controller 312 notifies the input-side output controller 319a of information indicating that the adjustment of the attenuation is completed, by outputting a notification signal Na to the input-side output controller 319a. By stopping the output of the first excitation light Ld, the level of the signal light Ls is reduced by the input-side EDF315a, as described above.

Figure 7:
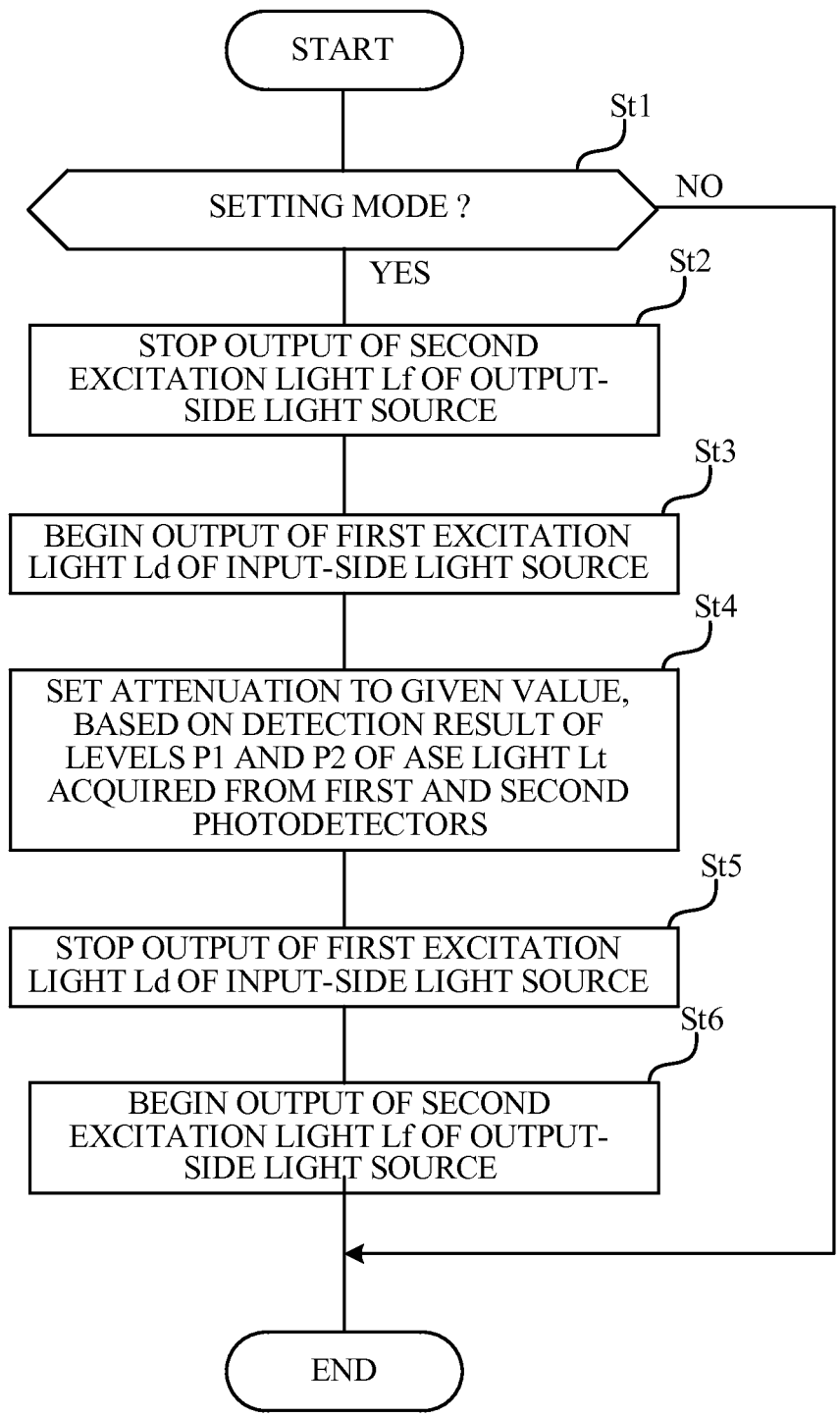
FIG. 7 is a flowchart illustrating the operation of the optical amplifier according to another embodiment.

FIG. 7 is a flowchart illustrating the operation of the output-side optical amplifier 31 according to the another embodiment. When the operative state of the output-side optical amplifier 31 is the setting mode (YES in step St1), the output-side light source 311b stops the output of the second excitation light Lf according to the control of the output-side output controller 319b (step St2). On the other hand, when the operative state of the output-side optical amplifier 31 is not the setting mode, i.e., the operational mode (NO in step St1), the output-side optical amplifier 31 terminates the present process.

Next, the input-side light source 311a begins the output of the first excitation light Ld according to the control of the input-side output controller 319a (step St3). Next, the attenuation controller 312 sets the attenuation to the given value, based on the detection result of the levels P1 and P2 of the ASE light Lt acquired from the first photodetector 51a and the second photodetector 51b (step St4). Thereby, the attenuation of the variable optical attenuator 314 becomes larger than that of the operational mode, and the signal light Ls to be inputted to the output-side EDF 315b is attenuated.

Next, the input-side light source 311a stops the output of the first excitation light Ld according to the control of the input-side output controller 319a (step St5). Thereby, the input-side EDF315a functions as the loss medium, and attenuates the signal light Ls to be inputted to the output-side EDF 315b.

Next, the output-side light source 311b begins the output of the second excitation light Lf according to the control of the output-side output controller 319b (step St6). At this time, the output-side output controller 319b controls the output of the second excitation light Lf of the output-side light source 311b, based on the detection result of the level Pout_s of the ASE light Le outputted from the output-side EDF 315b. Here, the level Pout_s of the ASE light Le is acquired from the output-side photodetector 310b. Thus, when the operative state is the setting mode, the output-side optical amplifier 31 outputs the ASE light Le to the input-side optical amplifier 32.

As described above, the output-side optical amplifier 31 according to the embodiments includes the input-side EDF 315a, the output-side EDF 315b, the variable optical attenuator 314, the mode selector 61, the gain controller 313, the input-side output controller 319a, the output-side output controller 319b, and the attenuation controller 312. The input-side EDF 315a excites the inputted signal light Ls by the first excitation light Ld to amplify the inputted signal light Ls. The variable optical attenuator 314 attenuates the signal light Ls outputted from the input-side EDF 315a. The output-side EDF 315b excites the signal light Ls outputted from the variable optical attenuator 314 by the second excitation light Lf to amplify the signal light Ls.

The mode selector 61 selects the operative state from the operational mode and the setting mode. When the operative state is the operational mode, the gain controller 313 controls the first excitation light Ld and the second excitation light Lf outputted to the input-side EDF 315a and the output-side EDF 315b, respectively so that the gain of the power of the signal light Ls becomes constant. When the operative state is the setting mode, the input-side output controller 319a controls the first excitation light Ld outputted to the input-side EDF 315a. When the operative state is the setting mode, the output-side output controller 319b controls the second excitation light Lf to be outputted to the output-side EDF 315b so that the ASE light Le having a fixed level is outputted from the output-side EDF 315b to the outside of the output-side optical amplifier 31.

When the operative state is the operational mode, the attenuation controller 312 controls the attenuation of the variable optical attenuator 314 according to the input level Lin_s of the signal light Ls. When the operative state is the setting mode, the attenuation controller 312 controls the attenuation of the variable optical attenuator 314 so as to become the given value larger than the value in the operational mode.

According to the output-side optical amplifier 31 of the embodiments, when the ASE light Le is outputted to the input-side optical amplifier 32 in the setting mode, the attenuation of the variable optical attenuator 314 is made larger than the attenuation in the operational mode. Therefore, the level of the signal light Ls to be outputted to the output-side EDF 315b is reduced, and the optical surge is restrained. Accordingly, unlike the technology disclosed by the above-mentioned patent documents 1, the output-side optical amplifier 31 according to the embodiments can restrain the optical surge effectively, without providing a means for preventing the optical surge, such as a WDM shutter, on the outside of the output-side optical amplifier 31.

The transmission system according to the embodiments includes the above-mentioned output-side optical amplifier 31, and the input-side optical amplifier 32 that inputs the ASE light Le outputted from the output-side optical amplifier 31 via the transmission channel D. The input-side optical amplifier 32 measures the transmission loss LOS of the transmission channel D based on the detection result of the input level of the ASE light Le. Since the transmission system according to the embodiments includes the above-mentioned output-side optical amplifier 31, the transmission system has the same effects as the output-side optical amplifier 31.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical amplifier comprising:
    a first amplifier that excites an inputted signal light by a first excitation light to amplify the inputted signal light;
    a variable optical attenuator that attenuates the signal light outputted from the first amplifier;
    a second amplifier that excites the signal light outputted from the variable optical attenuator by a second excitation light to amplify the signal light;
    a mode selector that selects an operative state of the optical amplifier from a first mode and a second mode;
    a gain controller that, when the operative state is the first mode, controls the first excitation light and the second excitation light to be outputted to the first amplifier and the second amplifier, respectively so that a gain of the power of the signal light becomes constant;
    a first output controller that, when the operative state is the second mode, controls the first excitation light to be outputted to the first amplifier;
    a second output controller that, when the operative state is the second mode, controls the second excitation light to be outputted to the second amplifier so that a spontaneous emission light having a fixed level is outputted from the second amplifier to the outside of the optical amplifier; and
    an attenuation controller that controls an attenuation of the variable optical attenuator according to an input level of the signal light when the operative state is the first mode, and controls the attenuation so as to become a given value larger than a value in the first mode when the operative state is the second mode.

2. The optical amplifier as claimed in claim 1, wherein the first output controller stops outputting the first excitation light to the first amplifier when the operative state is the second mode.

3. The optical amplifier as claimed in claim 2, wherein before the first output controller stops outputting the first excitation light to the first amplifier, the first output controller controls the first excitation light to be outputted to the first amplifier so that a spontaneous emission light having a fixed level is outputted from the first amplifier, and
    when the operative state is the second mode, the attenuation controller controls the attenuation to become the given value based on a detection result of a level of the spontaneous emission light inputted from the first amplifier to the variable optical attenuator, and a level of the spontaneous emission light from the variable optical attenuator.

4. The optical amplifier as claimed in claim 1, wherein the second output controller controls the second excitation light to be outputted to the second amplifier, based on a detection result of a level of the spontaneous emission light outputted from the second amplifier.

5. A transmission system comprising:
    a first optical amplifier including:
        a first amplifier that excites an inputted signal light by a first excitation light to amplify the inputted signal light;

a variable optical attenuator that attenuates the signal light outputted from the first amplifier;

a second amplifier that excites the signal light outputted from the variable optical attenuator by a second excitation light to amplify the signal light;

a mode selector that selects an operative state of the first optical amplifier from a first mode and a second mode;

a gain controller that, when the operative state is the first mode, controls the first excitation light and the second excitation light to be outputted to the first amplifier and the second amplifier, respectively so that a gain of the power of the signal light becomes constant;

a first output controller that, when the operative state is the second mode, controls the first excitation light to be outputted to the first amplifier;

a second output controller that, when the operative state is the second mode, controls the second excitation light to be outputted to the second amplifier so that a spontaneous emission light having a fixed level is outputted from the second amplifier to the outside of the optical amplifier; and an attenuation controller that controls an attenuation of the variable optical attenuator according to an input level of the signal light when the operative state is the first mode, and controls the attenuation so as to become a given value larger than a value in the first mode when the operative state is the second mode; and a second optical amplifier that inputs the spontaneous emission light outputted from the first optical amplifier via a transmission channel, and measures transmission loss of the transmission channel based on a detection result of an input level of the spontaneous emission light.

* * * * *